US00RE40497E

(19) United States
(12) Reissued Patent
Tal et al.

(10) Patent Number: US RE40,497 E
(45) Date of Reissued Patent: Sep. 9, 2008

(54) COMMUNICATION SYSTEM WHICH DYNAMICALLY SWITCHES SIZES OF SAMPLE BUFFER BETWEEN FIRST SIZE FOR QUICK RESPONSE TIME AND SECOND SIZE FOR ROBUSTNESS TO INTERRUPT LATENCY

(75) Inventors: Nir Tal, Haifa (IL); Ron Cohen, Ramat Hasharon (IL); Zeev Collin, Tustin, CA (US)

(73) Assignee: Silicon Laboratories Inc., Austin, TX (US)

(21) Appl. No.: 09/771,010
(22) Filed: Jan. 26, 2001

Related U.S. Patent Documents

Reissue of:
(64) Patent No.: 5,864,714
Issued: Jan. 26, 1999
Appl. No.: 08/632,931
Filed: Apr. 16, 1996

(51) Int. Cl.
*G06F 13/14* (2006.01)

(52) U.S. Cl. ..... 713/1; 710/56; 710/57; 710/260

(58) Field of Classification Search ..... 710/56, 710/71; 379/406.08
See application file for complete search history.

(56) References Cited

U.S. PATENT DOCUMENTS

| | | | |
|---|---|---|---|
| 4,823,312 | A | 4/1989 | Michael et al. |
| 4,841,526 | A | 6/1989 | Wilson et al. |
| 5,077,550 | A | 12/1991 | Cormier |
| 5,327,428 | A | 7/1994 | Van As et al. |
| 5,425,098 | A | 6/1995 | Kamiya |
| 5,440,740 | A | 8/1995 | Chen et al. |
| 5,585,803 | A | 12/1996 | Miura et al. |
| 5,864,714 | A | 1/1999 | Tal et al. |

FOREIGN PATENT DOCUMENTS

| | | | |
|---|---|---|---|
| DE | 37 05 176 | A | 9/1988 |
| EP | 0 340 613 | | 11/1989 |
| EP | 0 577 115 | A | 1/1994 |
| EP | 0 657 824 | A | 6/1995 |
| JP | 6-6387 | | 1/1994 |
| JP | 6-216970 | | 8/1994 |
| JP | 6-326748 | | 11/1994 |
| JP | 8-8977 | | 1/1996 |

OTHER PUBLICATIONS

Kenworthy, "Modems. (Optimizing modem data flow) (World–Class Tune–Up Tips: Hardware Heaven)", CMP Publications Inc., Windows Magazine, v6,n7, pp. 150–152, Jun. 20, 1995.

*Primary Examiner*—Abdelmoniem Elamin
(74) *Attorney, Agent, or Firm*—O'Keefe, Egan, Peterman & Enders LLP

(57) ABSTRACT

An apparatus for and method of implementing a novel buffer ba full duplex communication system is disclosed. The disclosed invention is particularly useful in native sign processing systems wherein heavy contention of processor resources typically exist, such as in systems running multitasking operating systems. The communication system of the present invention includes a receiver, transmitter, echo canceler. CODEC and telephone hybrid. The major components of the system operate on a buffer of input samples consisting of a set of input bits. The communications system operates to generate a buffer of output samples consisting of a set of output bits. The invention utilizes a novel buffer switching mechanism to optimize the tradeoff between processing response time, on one hand, and robustness to interrupt latency and processor implementation on the other hand. The internal processing of the modem works on a buffer full of samples once every time slice thus reducing the probability of a buffer underrun/overrun error occurring. The reduction in probability of data underrun/overrun is achieved by increasing the buffer size, thus giving the operating system greater leeway in choosing the exact time the signal processing functions are run. Small buffers, however, provide the communication system with short and accurate response time. These contradicting motives lead to the novel switchable size buffer scheme of the present invention. This is achieved without a loss of signal coherency.

48 Claims, 6 Drawing Sheets

COMMUNICATION SYSTEM WHICH DYNAMICALLY SWITCHES SIZES OF SAMPLE BUFFER BETWEEN FIRST SIZE FOR QUICK RESPONSE TIME AND SECOND SIZE FOR ROBUSTNESS TO INTERRUPT LATENCY

Matter enclosed in heavy brackets [ ] appears in the original patent but forms no part of this reissue specification; matter printed in italics indicates the additions made by reissue.

FIELD OF THE INVENTION

The present invention relates to communication systems and in particular to modems utilizing native signal processing.

BACKGROUND OF THE INVENTION

Traditional full duplex communications systems art typically implemented using dedicated hardware, such the prior at modem 12 illustrated in FIG. 1. Modem 12 includes a digital signal processor (DSP) integrated circuit (IC) 18 at its core, a random access memory (RAMS) 20, digital to analog converter (D/A) 24, analog to digital converter (A/D) 26 and data access arrangement (DAA) 28. Modem 12 is shown coupled to a host computer bus through bus interface circuitry 16. Host computer central processing unit (CPU) 14 generates the data to be transmitted through modem 12 and receives the data received by modem 12.

DSP based moderns such as the type illustrated in FIG. 1 generally operate by processing a relatively small number of samples from the input A/D converter 26 and generating a similarly small number of samples to be output through D/A converter 24. These systems are said to work on a 'sample by sample' basis or a 'symbol by symbol' basis, depending on the particular implementation. Such schemes have the benefit of minimal latency time, since the input is processed almost immediately. These schemes, however require very high computing power which is typically provided by a dedicated DSP.

Although modems such as the one illustrated in FIG. 1 can be veer powerful, they are also relatively expensive due to the dedicated DSP hardware involved. Therefore, the recent trend in the personal computer industry is to implement modems by exploiting the built in general CPU without the need for additional processing hardware. This requires the modem to share CPU time with other tasks executed by the system on the same processing unit. In i typical computer CPU, sharing is managed by an operating system on a 'time slice' basis. During every slice a different task executes. Task execution cm be preempted through interrupts caused by a periodic timer indicating the end of we current time slice, or by some other hardware device (e.g., an AID convener) indicating the occurrence of some event (e.g., the availability of a sample of data).

Although the interrupt mechanism is designed to switch the currently running task to a task that handles the interrupt in as little time as possible, in practice it may take a substantial amount of time before an interrupt is actually handled. The time delay may be caused by hardware delays, multiple sources of interrupts in the computer system or priority given to some interrupts over others. The time between the actual occurrence of the interrupt trigger and the begs of execution of the interrupt hailer routine is defined as 'interrupt latency.' A typical interrupt latency in the PC environment is in the range of 0 to 5 milliseconds. However, In the PC environment, there is no guarantee that a running program will give up control within a predefined amount of time. Well behaved programs can be expected not to dominate the CPU for an unreasonable time period, however some tasks may hold the CPU resource for a relatively long period of time.

Therefore a straight forward translation of a traditional DSP based modem to a native processing environment (NSP) is very problematic, since it requires the execution of the modem task each sample (or symbol) and the completion of its execution before the next sample (symbol) arrives in order to meet the 'real time' operation requirement. In order to minimize the time between a sample (or symbol) arrival and the modem activation, a straight forward implementation would be to generate an interrupt upon the arrival of each sample (i.e., symbol). In such an implementation, the real time constraint may be too difficult to overcome and the modem routine may not be executed on time due to long interrupt latencies, which may result in data loss. This problem can be overcome by designing the modem routine to operate on a buffer of samples rather than on one sample only. A buffer of samples means a longer time period between consecutive calls to the modem routine. The real time requirement in this case is that the time to process m input buffer of samples and to generate an output buffer for transmission is smaller than the time it takes to receive/transmit a buffer.

The buffer operation scheme, however, poses a new problem. It suffers from an inherent delay disadvantage, since a sample received at the beginning of a buffer is processed only after a whole buffer is received. This disadvantage conflicts with some high rate data pumping modem standards, such as the ITU V.32bis 14,400 bps modem standard, which impose strict time constraints for processing the samples and responding to certain signals from the modem located on the other end of the connection. For example, the V,32bis stank contains a ranging stage at the beginning of the modem connection. During this stage, the specification requires a maximum response time of 26.6 ms to respond to the other modem's ranging signal. The minimum turn around time from the signal detection to response transmission must take into account sample acquisltion, processing, interrupt latency and buffer transmission.

SUMMARY OF THE INVENTION

The present invention has been developed to alleviate the problems discussed above in the implementation of an NSP based full duplex communication system. These problems include the necessity to be resistant to interrupt operating system and other task related latencies, in addition to opting and being able to operate with to implementation overhead, etc. As discussed above, severe time constraints exist in implementing modems for the public switched telephone network (PSTN) as the transmission bit rate is pushed higher and higher. In most communication systems, the time constraints are typically present during the initial startup of the communication link. In particular, during the ranging phase of the modem connection.

One solution to designing NSP modems capable of implementing higher bit rate standards, e.g., V.32 and V.34, taught by the present invention, is to utilize within the NSP modem buffers of non-fixed size. Allowing the buffer size to vary, allows the NSP software to adapt to the constraints of the standard. Small buffers provide the communication system with short and accurate response times. On the other hand, increasing the buffer size would make the modem processing more robust, reducing the implementation overhead making it more resistant to operating system latencies and giving it greater flexibility in the exact time within the time slice, i.e. between interrupts, that processing can occur without disturbing the data flow. A more robust task is less susceptible to the tasks that are not well behaved, i.e., they hold the CPU for a relatively long period of time.

When the system is in a steady state and can got by with longer response times, it should be able to operate with larger buffers. In such a system, a point in time is reached where the buffer size can be increased without data overruns/underruns or other errors occurring.

In addition, the buffer switching taught by the present invention does not incur any data loss. Switching occurs smoothly and coherently without the loss of any data. Coherency is hereby defied as not losing or towing away any input or output samples.

Accordingly, it is an object of the present invention to provide a system for enabling high bite rate NSP based communications thereby overcoming the problems associated with the prior art.

It is another object of the present invention to provide a system that can vary the size of its data buffers in accordance with the desired latency time period.

Yet another object of the present invention to provide a system that can vary the size of its data buffers without incurring any data overruns or other data errors.

Another object of the present invention is to provide a system which optimizes system resources such as CPU usage, by reducing the relative implementation overhead of a call to the communication signal processing process.

It is yet another object of the present invention to provide a system which optimizes processor usage by using block optimized signal processing techniques which are more efficient for long data blocks.

The present invention discloses as full duplex communication system that utilizes a buffer interface for both signal reception and transmittal. The buffer interface includes a mechanism of switching between buffers of different sizes without losing any input or output samples. The buffer switching based communication system of the present invention collects a group of input samples and places them in a buffer. The system then processes the samples contained in the buffer and generates a buffer of samples to be transmitted. The reception and transmission buffers are typically of the same length. The length of the sample buffer determines the memory that must be allocated to store the buffer and it also determines the latency time. The latency is defined as the minimum communication system response time between the occurrence of an event at an input port to the generation of another event on an output port in response to the event at the input port. The worst case latency is shown to be exactly twice the time it takes to fill a buffer.

During the initial startup sequence a relatively short and accurate response time is required. Thus, during this phase, short buffers are used. However, later on in the long run (i.e., in the steady state), long buffers become more efficient. Therefore, there exists some point in time when the modem switches to a buffer with a different size. The buffer switching occurs without losing any coherency (i.e. without losing any data at the input or output ports).

There is thus provided, in accordance with a preferred embodiment, a method, in a communications system of achieving a balance between processing response time, on the one hand, and robustness to interrupt latency and processor implementation overhead, on the other hand, the method including of the steps of utilizing data buffers having a first buffer size when it is desired to optimize the communication system so as to have quick processing response times, and utilizing data buffers having a second buffer size when it is desired to optimize the communication system so as to be robust to interrupt latency and to have low processor implementation overhead.

In addition, the method other includes the step of providing switching means enabling the communication system to switch between using the buffers having a first buffer size and the buffers having a second buffer size. Also, the size of the buffers is coherently switched without any loss of data and the second buffer size is greater than the first buffer size. In addition, the second buffer size is switched back to a smaller size when modem connection is reinitialized or restarted. The second buffer size can be switched back to a smaller size when a retrain sequence has been initialized, wherein the communication system implements an International Telecommunication Union standard chosen from the group of V.32, V,32bis an V.34.

There is also provided, in accordance with a preferred embodiment of the present invention, a method of implementing a communications system the communications system comprising a transmitter, echo canceler and a receiver, the method including the steps of performing echo cancellation, utilizing the echo canceler, on delayed output samples transmitted during time slice K−1, performing receive processing, utilizing the receiver, on the difference between input samples received from time slice K−1 and samples generated by the echo canceler during time slice K, an performing transmit processing, utilizing the transmitter, to generate the output samples to be transmitted during time slice K+1.

In addition, the transmitter, the echo canceler and the receiver are implemented using a central processing unit (CPU) of a computer and the size of the buffers is coherently switches without any loss of data.

BRIEF DESCRIPTION OF THE DRAWINGS

The invention is herein described, by way of example only, with reference to the accompanying drawing;, wherein.

DETAILED DESCRIPTION OF THE INVENTION

To better illustrate the operation and utility of the buffer switching system of the present invention, the system Is described in the framework of a full duplex voiceband modem. However, it is understood that the example presented throughout this disclosure in no way limits the scope of the present invention, One skilled in the art may take the principles of the system and methods of the present invention disclosed herein and apply them to many other types of full duplex communication systems, those of which that are well known in the art.

Figure 1:
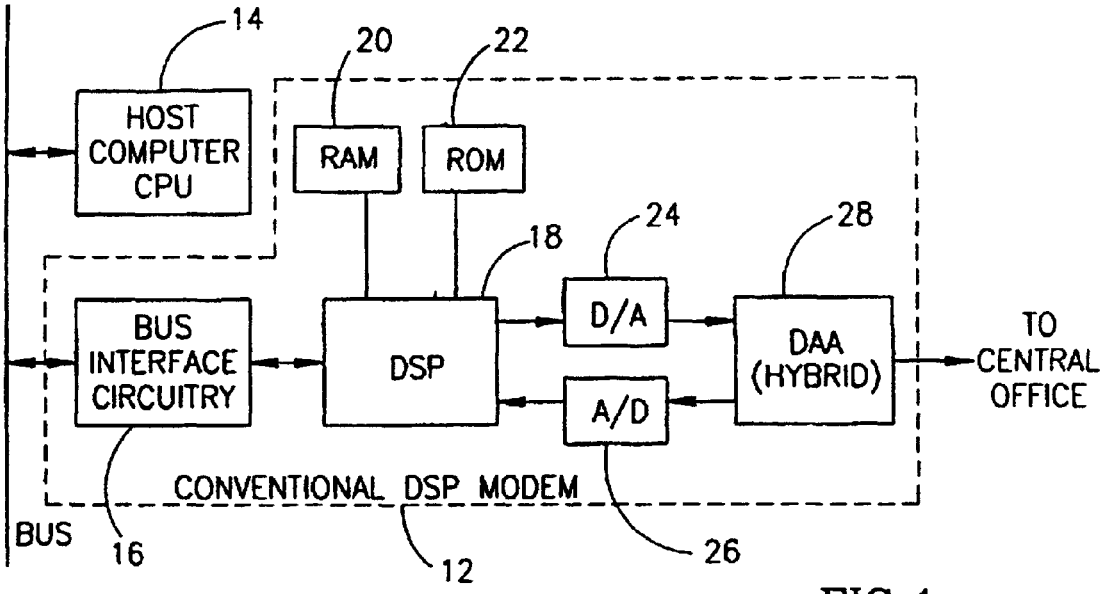
FIG. 1 PRIOR ART
FIG. 1 is a high level block diagram illustrating the a prior art conventional digital signal processor (DSP) modem coupled to a host computer.
Figure 2:
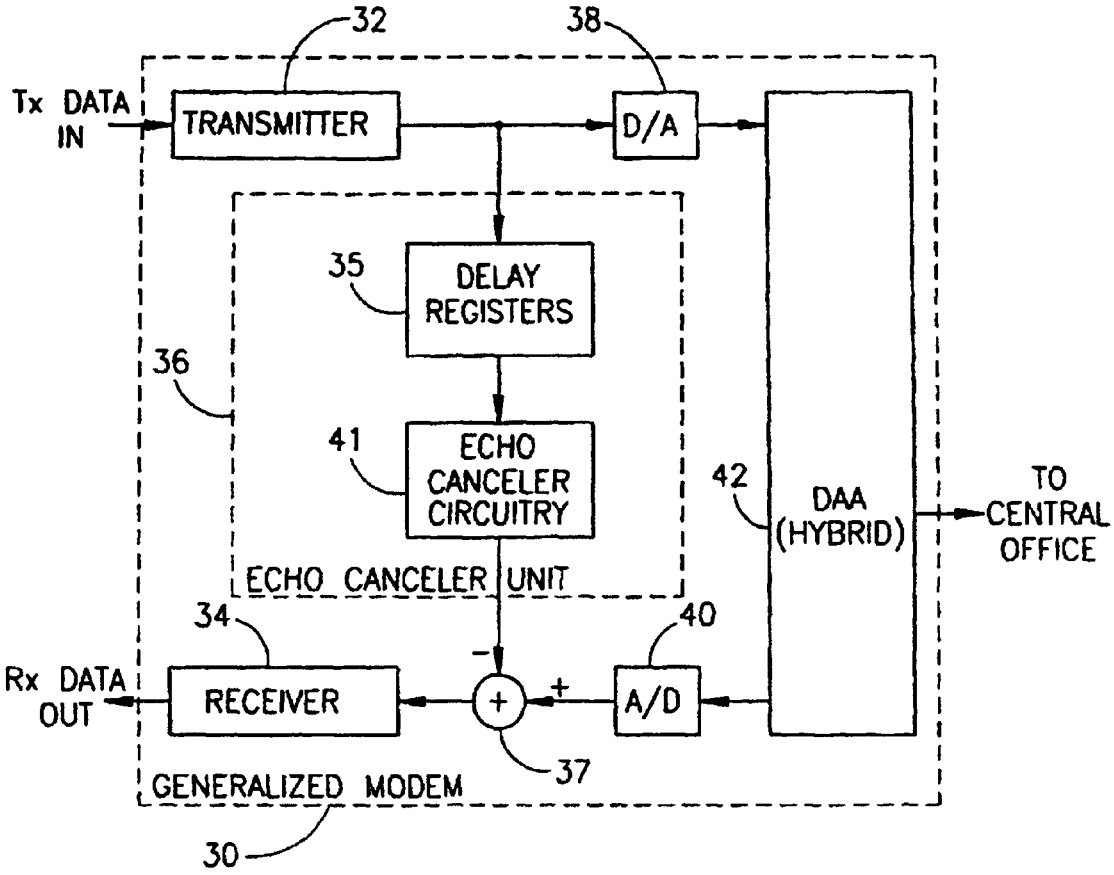
FIG. 2 is a high level functional block diagram illustrating a functional view of a modem utilize in the communication system of the present invention.

A high level functional block diagram illustrating a general realization of a full duplex voiceband modem 30 utilized in the communication system of the present invention is shown in FIG. 2. Modem 30 contains a transmitter 32, a receiver 34, an echo canceler unit 36, a summer 37, a digital to analog (D/A) convener 38, an analog to digital (A/D) convener 40 and a digital access arrangement (DAA) or hybrid 42. Echo canceler unit 36 comprises delay register stack 35 and echo canceler circuitry 41. Transmitter 32 received data from the transmitter data in port and outputs transmits (Tx) samples to echo canceler 36 and D/A 38. DAA 42 functions to match the impedances between the telephone line and the transmitter and receiver. It transforms balanced analog voltage On the two-wire pair from the central office (CO) to two two-wire unbalanced pairs, one for the transmitter and one for the receiver. Echo canceler 36 functions to remove echoes from the received signal by applying standard echo canceling techniques, which are well known in the art, to the transmitted signal. The output echo canceler 36 is summed with the receive signal using summer 37. Receiver 34 outputs a digital receive (Rx) data out signal.

Figure 3:
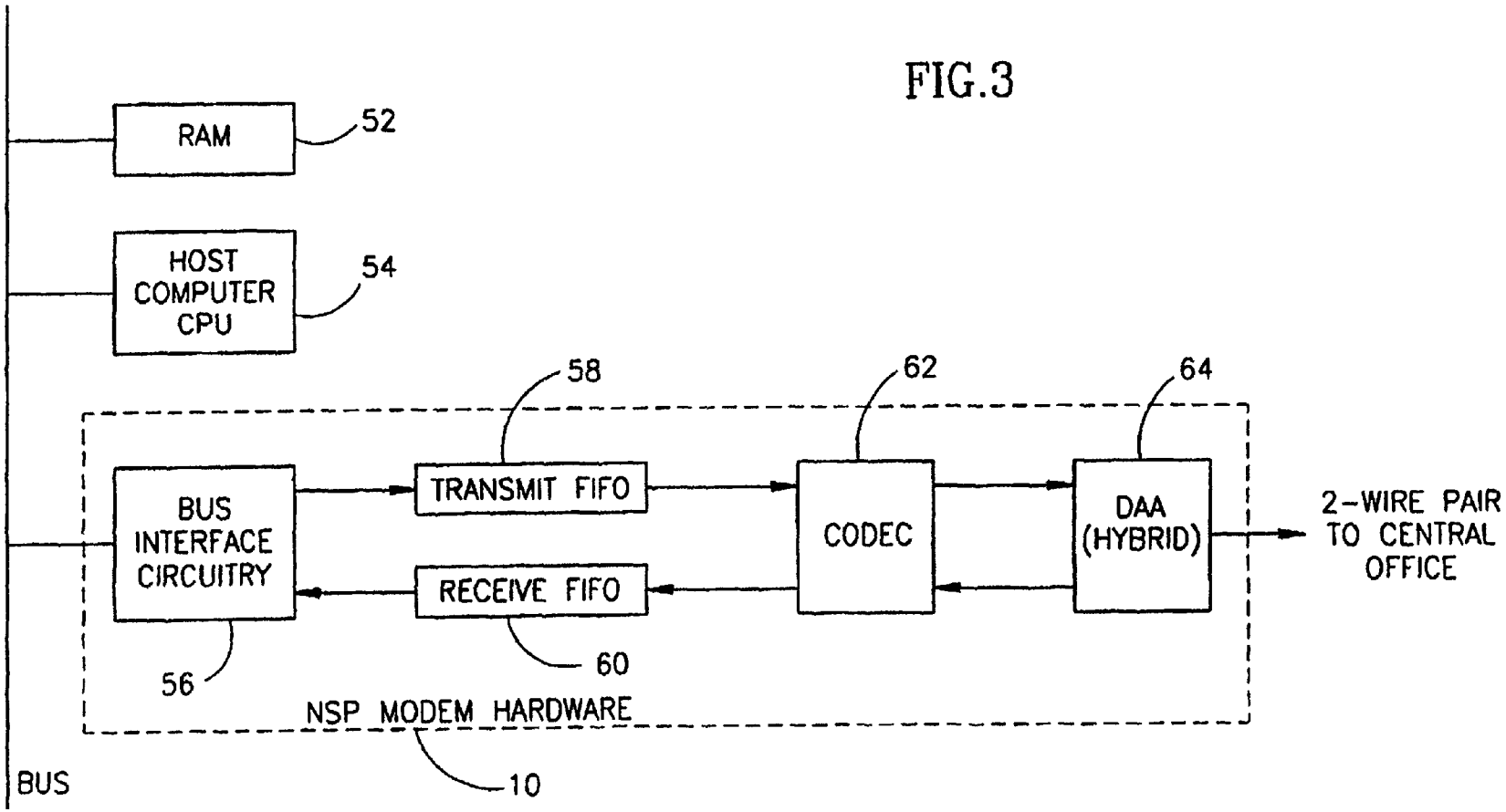
FIG. 3 is a high level block diagram illustrating the native signal processing NSP) modem of the present invention coupled to a host computer.

A high level block diagram illustrating the native signal processing (NSP) modem, generally referenced 10, coupled to a host computer is shown In FIG. 3. NSP modem 10 generally comprises a hardware portion and a software portion. The software portion runs on host computer CPU 54. FIG. 3 illustrated an implementation of a full duplex voiceband modem where the signal processing tasks shown in FIG. 2, i.e., transmitter 32, receiver 34 and echo canceler 36, are performed using a host computer central processing unit (CPU) 54. The host computer also includes random access memory (RAM) 52 for use by the operating system of the host computer and its task. During execution of the NSP modem, portions of the software used to run the modem are resident at varying times within RAM 52.

A DAA 64 forms the physical line interface to the 2-wire pair from the CO (e.g. RJ-11, RJ-45 or any other suitable connection method). The host CPU 54 communicates to NSP modem 10 through bus interface circuitry 56. Two first in first out (FIFO) buffers are used to buffer samples to and from the host computer CPU. A transmit FIFO 58 buffers outbound samples and a receive FIFO 60 buffers inbound samples. A coder/decoder (CODEC) 62 couples a transmit FIFO 58 and receive FIFO 60 to DAA 64. CODEC 62 performs the D/A and A/D functions of D/A 24 and A/D 26 (FIG. 2).

Figure 4:
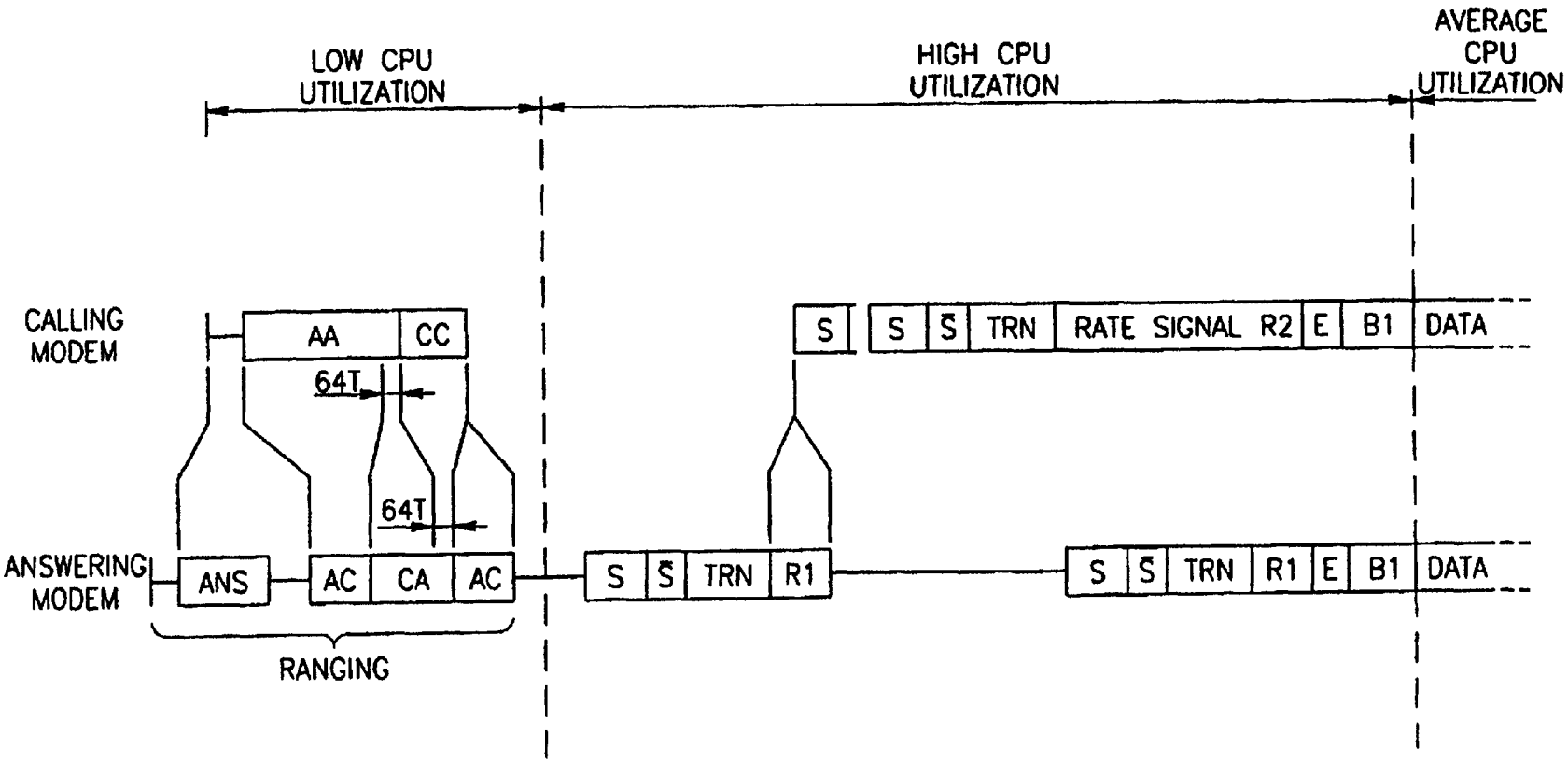
FIG. 4 illustrates the sequence of signals exchanged by the calling and answering modems during the start-up procedure of the V.32 bis modem standard.

Since the majority of personal computers today run some type of multi-tasking operating system, It will be assumed that host computer CPU 54 is executing some form of multtasking operating system. In this case, the system of using buffers of varying size taught by the present invention is used by NSP modem 10 to conform to the strict time tolerances imposed by the modem standards, e.g., V.32 and V.34 standards. To aid in understanding the mechanism of using buffers to varying sizes as taught by the present invention, the V.32 bis standard is used as an example. In particular, the V.32 bis start-up procedure which occurs before data can be exchanged, is described. Illustrated in FIG. 4 is the start-up sequence performed by the calling and answering modems as dined in the V.32 bis standard. The top portion shows the transmitted signal of the calling modem (i.e., the modern that placed the call) as a function of time. The bottom portion shows the tasks performed by the answering modem as a function of time. During the initial sequence, up until the 'S' on the answering modem, very short and accurate response times are required (e.g., 64T+/−2T which translates to 26.6+/−0.83 ms). During this so called ranging period, the round trip time delay of the far and echo is measured. These measurements are then used in the echo canceler circuitry 41 to eliminate echoes from the received signal.

To respond within the allotted time frame, short response times are needed. Thus, during this initial phase, short buffers are used. After the training stage 'TRN' onward, short and accurate event handling in not an absolute necessity and long buffers may be utilized, thus reducing the CPU context switching task overhead. Experiments undertaken by the inventor, using a PC equipped with a Pentium 100 MHz processor, have shown hat CPU utilization during the ranging period is relatively low, on the order of less than five percent During the training period CPU utilization increases add con exceed thirty percent. During the steady state data portion CPU utilization falls to less than thirty percent.

Figure 5:
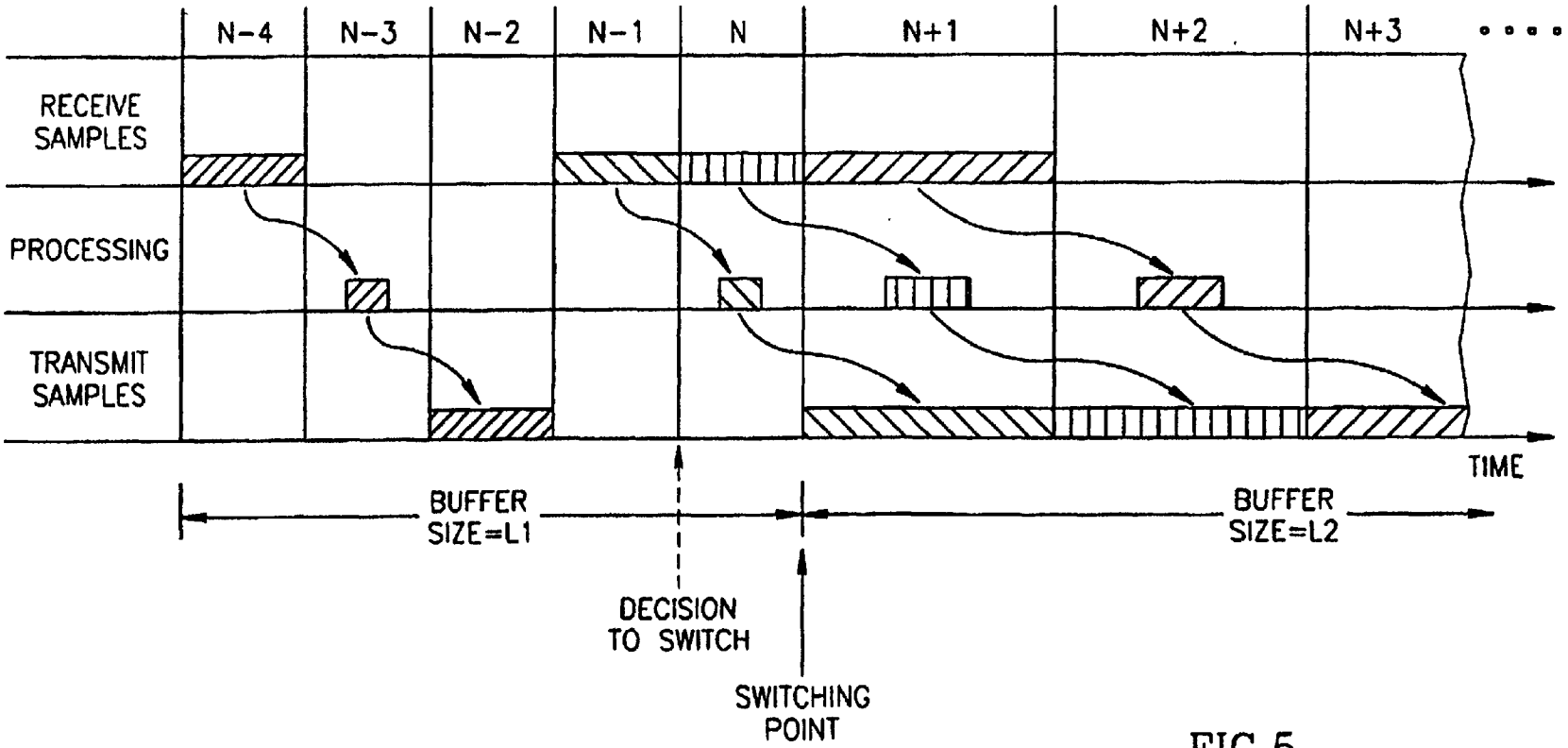
FIG. 5 illustrates the steps of receiving, processing and transmitting in relation to the sequencing of time slices.

FIG. 5 illustrates the steps of receiving, processing and transmitting in relation to the sequencing of time slices. Each column, located between two vertical lines represents one time slice. The vertical lines represent hardware interrupts that occur once at the start of each time slice or sample time. For each time slice the communication process running within NSF modem 10 is executed, During this time, the samples that were collected during the previous time slice are processed and samples are generated that are to be transmitted during the next time slice. Thus, samples that are collected during time slice N-4 are processed during time slice N-3. Also, during time slice N-3, samples are generated which will be transmitted during time slice N-2.

As previously discussed, during the ranging period of the start-up sequence (FIG. 4) both modems have a time constraint of 26.6+/−0.83 ms (i.c., 64T+/−2T) in which to respond to the other's signal. Assuming an average processing and associated hardware delay of 6.6 ms, there remains only 20 ms for modem processing, i.e., 20 ms for the inherent delay in the buffer mechanism. The maximum or worst cue delay in the buffer mechanism is two buffer let, given the buffer processing scheme described above. Hence, the maximum buffer length in time, can not exceed 10 ms. Thus, for CODECs that have a sampling frequency of 8 KHz, buffers having a length L1 equal to 64 samples are used during ranging. This translates to a buffer time of 8 ms. Assuming a processing overhead of 3 ms leaves a margin of 5 ms. Thus, if the interrupt latency or any other operating system imposed delays is greater than 5 ms, a data overrun will occur or the ranging between the modems will not be accurate enough for communications to take place.

At some point in time, the decision to switch to large buffers is made. In the case of V.32 bis, the switch to large buffers con occur after the ranging period has concluded, preferably before the training period has begun. The system of the present invention is oblivious to the samples contained in the sample buffers. It makes no difference whatsoever what the samples within the buffer are. The coherency characteristic of the present invention is described in more detail below.

The operation of the buffer switching mechanism around the point of switching will now be described in more detail. Assume time slice N-1 is current and a buffer full of samples is received during this slice. Assume also that small buffers are no longer needed and the decision to switch to larger buffers has been made. What entity makes the decision to switch is not relevant to the present invention. During time slice N, the sample received during slice N-1 are processed. However, the processor knows that from the next time slice forward, large buffers are to be used, Thus, the processor generates a buffer of samples to be transmitted that has a length L2 greater than L1. For example purposes L2 is equal to 256. The transmit process is independent of the other components of the system and therefore can produce buffers having any arbitrary number of samples. Thus, a buffer of size 256 samples is generated by the processor during slice N. These samples will be transmitted during the following time slice N+1. Also during slice N, a small buffer of samples is received that are to be processed during slice N+1.

During the next slice N+1, a large buffer of samples is acquired and the small buffer of samples acquired during slice N is now processed. A large buffer of samples is generated for transmission during slice N+2. In addition, the large buffer of samples generated during slice N are transmitted during this slice N+1. Similarly, during slice N+2, the large buffer of samples received during slice N+1 are processed and a large buffer of samples is generated for transmission during slice N+3. The following table shows the buffer sizes used before and after the switching transition.

| Time Slice | Buffer Size Processed by Echo Canceler | Buffer Size Processed by the Receiver | Buffer Size Processed by the Transmitter |
|---|---|---|---|
| <N | L1 | L1 | L1 |
| N | L1 | L1 | L2 |
| N + 1 | L1 | L1 | L2 |
| >N + 1 | L2 | L2 | L2 |

With reference to the table above, the echo canceler processes the received buffer of slice K−1 during slice K, K being any arbitrary time slice. Thus, processing L1 samples in buffers less than or equal to N+1 and outputting buffers of exactly L1 samples. During time slice K, the receive process processes the difference between the buffer received in slice K−1 and the output of the echo canceler in slice K. Thus, in time slice N, the receiver will process the difference between the samples received during slice N−1, having a length L1, and the output of the echo canceler during slice N, also having a length L1. During time slice N+1, the receive process will process the difference between the received samples in time slice N, having a length L1, and the output of the echo canceler during slice N+1, also having a length L1.

Figure 6:
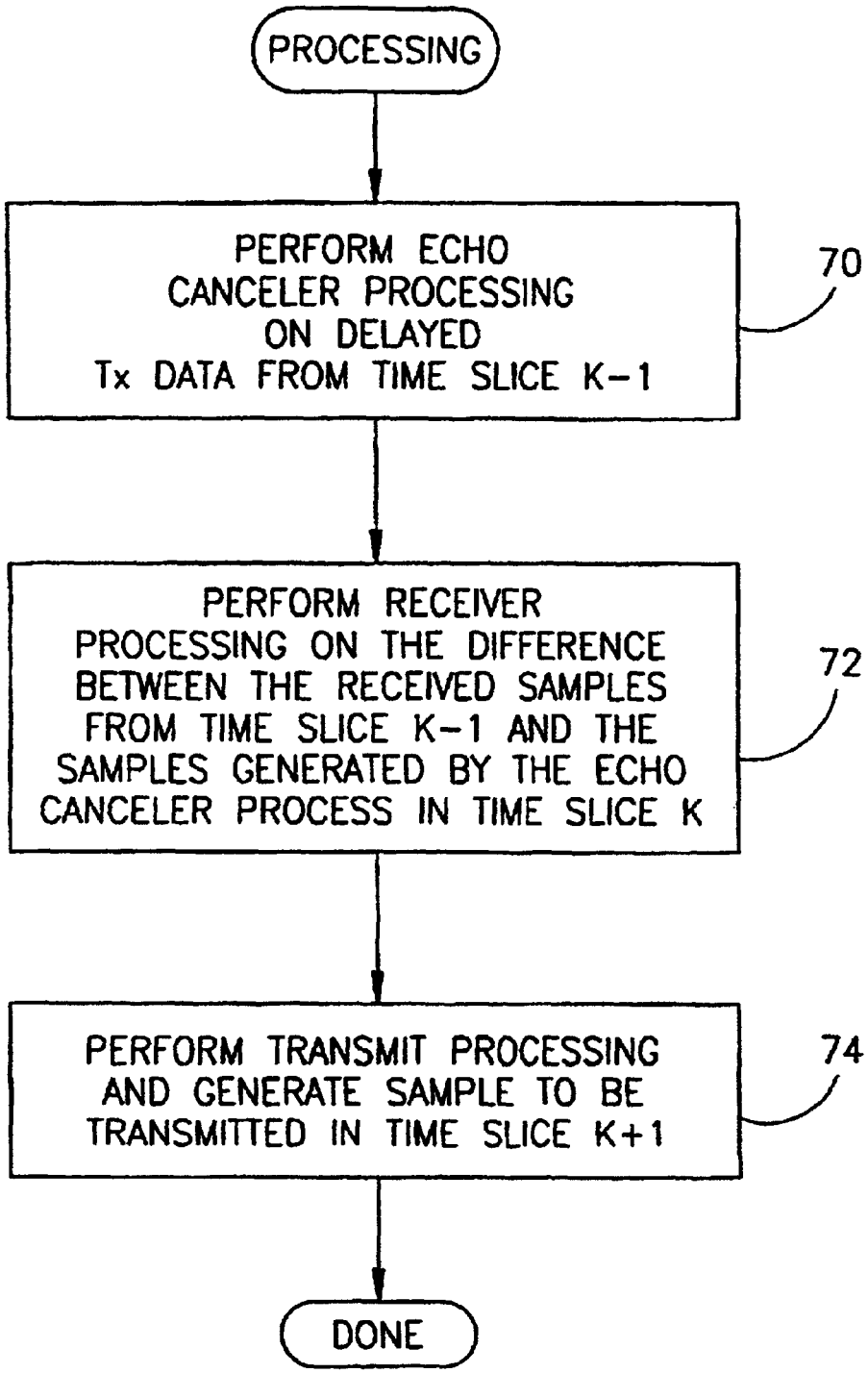
FIG. 6 is a high level flow diagram illustrating the processing sequence of the present invention.

To ensure that the receiver gets samples that have had echoes properly removed from them, the transmitted and received samples must be suitably aligned. In other words, the samples used by the echo canceler must be synchronized in time with the samples transmitted and received. This is achieved by placing one buffer delay register 35 (FIG. 2) in the path of the transmitted data before it is used by the echo canceler (assuming echo canceling processing occurs before transmitter processing). Thus, the transmitted data used by the echo canceler is properly delayed so as to be synchronized to the received data. Delay registers 35 ensure, that a small buffer is always subtracted from a small buffer and that a large buffer is always subtracted from a large buffer, thus maintaining data coherency, In order to meet the time constraints of the modem standards, the processing of the data must occur in a pertain order. Illustrated in FIG. 6, is a high level flow diagram showing the sequence of processing. Echo canceler unit 36 (FIG. 2) must run before the receiver sinus samples which are processed by the receiver comprise the difference between the received sample and the output of the echo canceler. As described previously, a summer 37 performs the subtraction. In addition, the receiver must run before the transmitter in order to maintain the maximum latency at two buffer times. An event triggered at the time of the first sample of a buffer received during a time slice K−1, will be detected during processing in slice K. The answer may appear as the first sample of the buffer transmitted during slice K+1. Thus, if the transmitter had run before the receiver, then the event might only have been responded to in the first sample of the buffer transmitted in slice K+2, making the latency three buffer times.

Therefore, echo canceler processing on delayed transmitter data is performed first (step 70). Then receiver processing is performed on the difference between the received samples from time slice K−1 and the samples generated by the echo canceler process in slice K (step 72). Finally, transmit processing is performed, generating a buffer full of samples to be transmitted during time slice K+1 (step 74) and stored in delay registers 35.

Thus, utilizing the buffer switching mechanism of the present invention, resistance to interrupt latency can be maximized. In the example provided above, buffers of size 256 at 8000 samples/sec yields 32 ms buffer times. Assuming thirty percent processing period gives a maximum interrupt latency of 22.4 ms, which provides a very large time margin. In addition, a side benefit of using long buffers is lowered CPU utilization in terms of lowered overhead enabling the CPU to perform other functions. The main benefit provided by the present invention is the ability of an NSP modem to conform to the strict time constraints of the higher bit rate modem standards (e.g., V.32 9600 bps) V.32bis 14,400 bps and V.34 28,800 bps).

In addition, if for any reason one of the modems requests a retrain process during a connection, the buffer size can be changed back to a short buffer size so that a retain process can occur At at later time, the buffer size Is switched back to a larger buffer size.

While the invention has been described with respect to a limited number of embodiments, it will be appreciated that many variations, modifications and other applications of the invention may be made.

What is claimed is:

[1. A method, in a communications system, of achieving a balance between processing response time, on one hand, and robustness to interrupt latency and processor implementation overhead, on the other hand, said method comprising of the steps of:

utilizing sample buffers having a first buffer size when it is desired to optimize said communication system so as to have quick processing response times;

utilizing sample buffers having a second buffer size when it is desired to optimize said communication system so as to be robust to interrupt latency and to have low processor implementation overhead; and providing switching means enabling said communication system to dynamically switch between using said buffers having a first buffer size and said buffers having a second buffer size.]

[2. The method according to claim 1, wherein the size of said sample buffers is coherently switched without any loss of data.]

[3. The method according to claim 1, wherein said second buffer size is greater than said first buffer size.]

[4. The method according to claim 1, wherein the size of said sample buffer is switched to said first buffer size when the modem connection is reinitialized or restarted.]

[5. The method according to claim 1, wherein the size of said sample buffer is switched to said first buffer size when a retrain sequence has been initialized, wherein said communication system implements an International Telecommunication Union standard chosen from the group of V.32, V.32 bis and V.34.]

[6. A system, in a communications system, for achieving a balance between processing response time, on one hand, and robustness to interrupt latency and processor implementation overhead, on the other hand, said system comprising:

means for utilizing sample buffers having a first buffer size when it is desired to optimize said communication system so as to have quick processing response times;

means for utilizing sample buffers having a second buffer size when it is desired to optimize said communication system so as to be robust to interrupt latency and to have low processor implementation overhead; and switching means enabling said communication system to dynamically switch between using said buffers having a first buffer size and said buffers having a second buffer size.]

[7. The system according to claim 6, wherein the size of said sample buffers is coherently switched without any loss of data.]

[8. The system according to claim 1, wherein said second buffer size is greater than said first buffer size.]

[9. The system according to claim 6, wherein the size of said sample buffer is switched to said first buffer size when the modem connection is reinitialized or restarted.]

[10. The system according to claim 6, wherein the size of said sample buffer is switched to said first buffer size when a retrain sequence has been initialized, wherein said communication system implements an International Telecommunication Union standard chosen from the group of V.32, V.32 bis and V.34.]

[11. A method, in a communications system, of achieving a balance between processing response time, on one hand, and robustness to interrupt latency and processor implementation overhead, on the other hand, said communication system including a receiver, transmitter and associated receive sample buffer and transmit sample buffer, wherein sample processing is divided into time slices within said communication system, said method comprising of the steps of:

utilizing receive and transmit sample buffers having a first buffer size L1 when it is desired to optimize said communication system so as to have quick processing response times;

utilizing receive and transmit sample buffers having a second buffer size L2 when it is desired to optimize said communication system so as to be robust to interrupt latency and to have low processor implementation overhead;

providing switching means enabling said communication system to dynamically switch between using said transmit and receive sample buffers having a size L1 and a size L2;

making a determination to switch buffer sizes before the activation of said transmitter during time slice N;

processing a receive buffer to length L1 and a transmit buffer of length L1 during time slice N−1;

processing a receive buffer of length L1 and a transmit buffer of length L2 during time slice N+1; and processing a receive buffer of length L2 and a transmit buffer of length L2 during time slice N+2 and during time slices thereafter until such decision to switch buffer sizes.]

[12. The method according to claim 11, wherein the size of said transmit and receive sample buffers is coherently switched without any loss of data.]

*13. A method of achieving a balance between response time and system latency in a communication system, said communication system including a receiver and a transmitter, wherein sample processing is divided into time slices within said communication system, said method comprising the steps of:*

*employing a receive sample buffer and a transmit sample buffer, each having a first buffer size L1 capable of quick response times;*

*employing a receive sample buffer and a transmit sample buffer, each having a second buffer size L2 capable of accommodating system latency;*

*employing a switching device enabling said communication system to dynamically switch between said transmit sample buffers and between said receive sample buffers;*

*making a determination to switch between said first buffer size L1 and said second buffer size L2 before the activation of said transmitter during a time slice N;*

*processing said receive sample buffer having said first buffer size L1 and said transmit sample buffer having said first buffer size L1 during a time slice N−1;*

*processing said receive sample buffer having said first buffer size L1 and said transmit sample buffer having said second buffer size L2 during said time slice N;*

*processing said receive sample buffer having said first buffer size L1 and said transmit sample buffer having said second buffer size L2 during a time slice N+1; and*

*processing said receive sample buffer having said second buffer size L2 and said transmit sample buffer having said second buffer size L2 during a time slice N+2 and during time slices thereafter until deciding to switch between said first buffer size L1 and said second buffer size L2.*

*14. The method of claim 13, wherein the size of said transmit and receive sample buffers is coherently switched without any loss of data.*

*15. A system for achieving a balance between response time and system latency in a communication system, said system comprising:*

*sample buffers having a first buffer size capable of quick response times;*

*sample buffers having a second buffer size capable of accommodating system latency; and*

*a switching device capable of dynamically switching between the use of said sample buffers having said first buffer size and said sample buffers having said second buffet size.*

*16. The system of claim 15, wherein said second buffer size is robust so as to accommodate system latency.*

*17. The system of claim 15, wherein said sample buffers are maintained in a memory.*

*18. The system of claim 15, wherein said sample buffers are maintained in physical buffers.*

*19. The system of claim 15, wherein said dynamic switching is performed in response to communication system operating requirements.*

*20. The system of claim 15, wherein said system latency comprises interrupt latency.*

*21. The system of claim 15, wherein said system latency comprises bus latency.*

*22. The system of claim 15, wherein said system latency comprises both interrupt latency and bus latency.*

*23. The system of claim 15, wherein the size of said sample buffers is coherently switched without any loss of data.*

*24. The system of claim 15, wherein said second buffer size is greater than said first buffer size.*

*25. The system of claim 15, wherein the size of said sample buffers is switched to said first buffer size when a modem connection is reinitialized or restarted.*

*26. The system of claim 15, wherein the size of said sample buffers is switched to said first buffer size when a retrain sequence has been initialized, wherein said communication system implements an International Telecommunication Union standard chosen from the group of V.32, V.32bis and V.34.*

*27. A system for achieving a balance between response time and system latency in a communication system, said system comprising:*

*sample buffers having a first buffer size capable of quick response times;*

*sample buffers having a second buffer size that is robust so as to accommodate system latency; and*

*a switching device capable of dynamically switching between the use of said sample buffers having said first buffer size and said sample buffers having said second buffer size.*

*28. A system for achieving a balance between response time and system latency in a communication system, said system comprising:*

*a sample buffer that is variable in size, wherein the sample buffer has a first buffer size capable of quick response times and a second buffer size capable of accommodating system latency; and*

*a switching device capable of dynamically switching between said first buffer size and said second buffer size of the sample buffer.*

*29. A machine readable storage medium containing executable instructions which, when executed by a machine, cause the machine to perform the steps of a method for achieving a balance between response time and system latency in a communication system, the method comprising:*

*employing sample buffers having a first buffer size capable of quick response times;*

*employing sample buffers having a second buffer size capable of accommodating system latency; and*

*dynamically switching between the use of said sample buffers having said first buffer size and said sample buffers having said second buffer size.*

*30. The medium of claim 29, wherein said second buffer size is robust so as to accommodate system latency.*

*31. The medium of claim 29, wherein said dynamic switching is performed in response to communication system operating requirements.*

*32. The medium of claim 29, wherein said system latency comprises interrupt latency.*

*33. The medium of claim 29, wherein said system latency comprises bus latency.*

*34. The medium of claim 29, wherein said system latency comprises both interrupt latency and bus latency.*

*35. The medium of claim 29, wherein the size of said sample buffers is coherently switched without any loss of data.*

*36. The medium of claim 29, wherein said second buffer size is greater than said first buffer size.*

*37. The medium of claim 29, wherein the size of said sample buffers is switched to said first buffer size when a modem connection is reinitialized or restarted.*

*38. The medium of claim 29, wherein the size of said sample buffers is switched to said first buffer size when a retrain sequence has been initialized, wherein said communication system implements an International Telecommunication Union standard chosen from the group of V.32, V.32bis and V.34.*

*39. A machine readable storage medium containing executable instructions which, when executed by a machine, causes the machine to perform the steps of a method for achieving a balance between response time and system latency in a communication system, the method comprising:*

*employing sample buffers having a first buffer size capable of quick response times;*

*employing sample buffers having a second buffer size that is robust so as to accommodate system latency in said communication system; and*

*employing a switching device capable of dynamically switching between the use of said sample buffers having said first buffer size and said sample buffers having said second buffer size.*

*40. A machine readable storage medium containing executable instructions which, when executed by a machine, causes the machine to perform the steps of a method for achieving a balance between response time and system latency in a communication system, the method comprising:*

*employing a sample buffet that is variable in size, wherein said sample buffer has a first buffer size capable of quick response times and a second buffer size capable of accommodating system latency; and*

*employing a switching device capable of dynamically switching between said first buffer size and said second buffer size of said sample buffer.*

*41. A method of achieving a balance between response time and system latency in a communication system, said method comprising:*

*employing sample buffers having a first buffer size capable of quick response times;*

*employing sample buffers having a second buffer size capable of accommodating system latency; and*

*employing a switching device capable of dynamically switching between said sample buffers having said first buffer size and said sample buffers having said second buffer size.*

*42. The method of claim 41, wherein said second buffer size is robust so as to accommodate system latency.*

*43. The method of claim 41, wherein said dynamic switching is performed in response to communication system operating requirements.*

*44. The method of claim 41, wherein said system latency comprises interrupt latency.*

*45. The method of claim 41, wherein said system latency comprises bus latency.*

*46. The method of claim 41, wherein said system latency comprises both interrupt latency and bus latency.*

*47. The method of claim 41, wherein the size of said sample buffers is coherently switched without any loss of data.*

*48. The method of claim 41, wherein said second buffer size is greater than said first buffer size.*

*49. The method of claim 41, wherein the size of said sample buffers is switched to said first buffer size when a modem connection is reinitialized or restarted.*

*50. The method of claim 41, wherein the size of said sample buffers is switched to said first buffer size when a*

*retrain sequence has been initialized, wherein said communication system implements an International Telecommunication Union standard chosen from the group of V.32, V.32bis and V.34.*

*51. A method of achieving a balance between response time and system latency in a communications system, said method comprising:*

*employing sample buffers having a first buffer size capable of quick response times;*

*employing sample buffers having a second buffer that is robust so as to accommodate system latency in said communication system; and*

*employing a switching device capable of dynamically switching between said sample buffers having said first buffer size and said sample buffers having said second buffer size.*

*52. A method of achieving a balance between response time and system latency in a communication system, said method comprising:*

*employing a sample buffer that is variable in size, wherein said sample buffer has a first buffer size capable of quick response times and a second buffer size capable of accommodating system latency; and*

*employing a switching device capable of dynamically switching between said first buffer size and said second buffer size of said sample buffer.*

*53. A modem capable of performing a start-up procedure with a remote device before entering a data phase for exchanging data with said remote device, said start-up procedure having a first start-up sequence and a second start-up sequence, said modem comprising:*

*a sample buffer having a first buffer size for use during said first start-up sequence;*

*a sample buffer having a second buffer size for use during said first start-up sequence, wherein said second buffer size is greater than said first buffer size; and*

*a switching device capable of switching from said sample buffer having said first buffer size to said sample buffers having said second buffer size based on a transition in said start-up procedure from said first start-up sequence to said second start-up sequence.*

*54. The modem of claim 53, wherein said modem achieves a balance between response time and system latency in a communication system by switching from said sample buffer having said first buffer size to said sample buffers having said second buffer size.*

*55. The modem of claim 53, wherein said first start-up sequence is an initial start-up sequence of said start-up procedure.*

*56. The modem of claim 55, wherein said start-up procedure is performed according to the International Telecommunication Union V.32bis standard, and said initial start-up sequence includes the ranging phase of said V.32bis standard.*

*57. A method for use by a modem to perform a start-up procedure with a remote device before entering a data phase for exchanging data with said remote device, said start-up procedure having a first start-up sequence and a second start-up sequence, said method comprising:*

*employing a sample buffer having a first buffer size for use during said first start-up sequence;*

*employing a sample buffer having a second buffer size for use during said first start-up sequence, wherein said second buffer size is greater than said first buffer size; and*

*switching from said sample buffer having said first buffer size to said sample buffers having said second buffer size based on a transition in said start-up procedure from said first start-up sequence to said second start-up sequence.*

*58. The method of claim 57, wherein said switching achieves a balance between response time and system latency in a communication system.*

*59. The method of claim 57, wherein said first start-up sequence is an initial start-up sequence of said start-up procedure.*

*60. The method of claim 59, wherein said start-up procedure is performed according to the International Telecommunication Union V.32bis standard, and said initial start-up sequence includes the ranging phase of said V.32bis standard.*

* * * * *